(12) United States Patent
Lee

(10) Patent No.: US 9,983,338 B2
(45) Date of Patent: May 29, 2018

(54) OPTICAL MEMBER AND DISPLAY DEVICE INCLUDING THE SAME

(71) Applicant: Samsung Display Co., Ltd., Yongin-si, Gyeonggi-do (KR)

(72) Inventor: Innam Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days. days.

(21) Appl. No.: 15/181,277

(22) Filed: Jun. 13, 2016

(65) Prior Publication Data
US 2017/0102491 A1 Apr. 13, 2017

(30) Foreign Application Priority Data
Oct. 8, 2015 (KR) .......................... 10-2015-0141695

(51) Int. Cl.
*G02B 5/30* (2006.01)
*G06F 3/044* (2006.01)
*G06F 3/045* (2006.01)
*G02B 1/14* (2015.01)

(52) U.S. Cl.
CPC ............. *G02B 5/3033* (2013.01); *G02B 1/14* (2015.01); *G02B 5/3016* (2013.01); *G06F 3/044* (2013.01); *G06F 3/045* (2013.01); *G06F 2203/04112* (2013.01)

(58) Field of Classification Search
CPC ...... G02B 5/3033; G02B 1/14; G02B 5/3016; G02F 1/0136; G02F 1/133308; G02F 2001/13331; G02F 2001/13332; G02F 2001/133328; G02F 2001/133388; G02F 1/133528

USPC .......... 359/486.01, 490.01; 349/58, 96, 162; 345/76, 87
See application file for complete search history.

(56) References Cited

U.S. PATENT DOCUMENTS

| | | | | |
|---|---|---|---|---|
| 9,341,758 | B2* | 5/2016 | Matsuda ............... | G02B 5/3016 |
| 2011/0148839 | A1* | 6/2011 | Hwang .................. | G02B 5/205 |
| | | | | 345/211 |
| 2011/0234079 | A1* | 9/2011 | Eom ....................... | G02B 5/22 |
| | | | | 313/112 |
| 2015/0153495 | A1* | 6/2015 | Matsuda ............... | G02B 5/3016 |
| | | | | 349/194 |

(Continued)

FOREIGN PATENT DOCUMENTS

| | | |
|---|---|---|
| JP | 2012-47895 A | 3/2012 |
| KR | 10-2008-0084352 A | 9/2008 |
| KR | 10-1087328 B1 | 11/2011 |

(Continued)

*Primary Examiner* — Frank Font
(74) *Attorney, Agent, or Firm* — Lewis Roca Rothgerber Christie LLP

(57) ABSTRACT

Provided is a display device including a display member having an active region in which images are displayed and a surrounding region adjacent to the active region, wires being disposed in the surrounding region, a cover having a transmission region through which the images are transmitted and a bezel region adjacent to the transmission region, and a polarizer between the display member and the cover, the polarizer having, in a plan view, a first region overlapping the active region and having a first transmittance and a second region overlapping the surrounding region and having a second transmittance lower than the first transmittance.

13 Claims, 9 Drawing Sheets

(56) References Cited

U.S. PATENT DOCUMENTS

2015/0192758 A1* 7/2015 Yamagata ............ G02B 5/3025
                                                                        348/360
2016/0351856 A1* 12/2016 Jung .................... G02B 5/3083

FOREIGN PATENT DOCUMENTS

| KR | 10-1318064 B1 | 10/2013 |
| KR | 10-2014-0133732 A | 11/2014 |
| KR | 10-2015-0039148 A | 4/2015 |

* cited by examiner

OPTICAL MEMBER AND DISPLAY DEVICE INCLUDING THE SAME

CROSS-REFERENCE TO RELATED APPLICATIONS

This U.S. non-provisional patent application claims priority under 35 U.S.C. § 119 to and the benefit of Korean Patent Application No. 10-2015-0141695, filed on Oct. 8, 2015, the entire contents of which are hereby incorporated by reference.

BACKGROUND

1. Field

The present disclosure relates to an optical member capable of realizing a slim bezel and a display device including the same.

2. Description of the Related Art

Flat-panel displays have been developed to replace cathode-ray tube displays which have large thicknesses and consume large amounts of power. Examples of the flat-panel displays include organic light emitting displays, liquid crystal displays, and plasma displays.

A display device includes a plurality of optical members. The optical members enhance the efficiency of light generated within the display device, and reduce the influence of ambient light. Because images are displayed using internal light and the influence of ambient light is reduced, the display device may have improved image visibility.

A predetermined bezel may be defined in a display device. The bezel prevents light leakage to a region other than an image display region, prevents internal wires from being viewed from the outside, and provides an aesthetic sense to the display device.

SUMMARY

The present disclosure provides an optical member for realizing a slim bezel and a display device having a slim bezel.

A display device according to an embodiment of the inventive concept includes a display member having an active region in which images are displayed and a surrounding region adjacent to the active region, wires being disposed in the surrounding region, a cover having a transmission region through which the images are transmitted and a bezel region adjacent to the transmission region, and a polarizer between the display member and the cover, the polarizer having, in a plan view, a first region overlapping the active region and having a first transmittance and a second region overlapping the surrounding region and having a second transmittance lower than the first transmittance In an embodiment, the second region may entirely overlap at least the wires.

In an embodiment, a portion of the second region may not overlap the bezel region.

In an embodiment, a boundary between the bezel region and the transmission region may overlap the second region.

In an embodiment, a portion of the surrounding region may not overlap the bezel region.

In an embodiment, the second transmittance may be higher than the transmittance of the cover in the bezel region.

In an embodiment, the display member may include a display panel configured to generate the images, and a touch panel on the display panel, the touch panel being configured to receive external touch inputs.

In an embodiment, the touch panel may include a plurality of touch electrodes which are in the active region and configured to sense external touch inputs and a plurality of pads in the surrounding region. The wires may respectively connect the touch electrodes and the pads.

In an embodiment, the second region may entirely overlap the wires, and the bezel region may not overlap at least a portion of the wires.

In an embodiment, the polarizer may include a polarization part overlapping the first and second regions and may be configured to absorb light vibrating in one direction among incident light, and a pattern part corresponding to the second region.

In an embodiment, the pattern part may include a lyotropic chromonic liquid crystal or a reactive mesogen.

In an embodiment, the polarization part may include a plurality of layers, and the pattern part may be disposed between at least any two layers among the plurality of layers.

In an embodiment, the pattern part may have a frame shape in a plan view.

An optical member according to an embodiment of the inventive concept includes a polarizer having, on a plan view, a first region having a first transmittance and a second region adjacent to the first region and having a second transmittance lower than the first transmittance, and a protection member on one side of the polarizer and protecting the polarizer.

In an embodiment, the polarizer may include a polarization part overlapping the first and second regions and having the first transmittance and in which an absorption axis extending in one direction is defined, and a pattern part overlapping at least a portion of the polarization part so as to define the second region, the pattern part having a third transmittance. The third transmittance may be lower than 100%.

In an embodiment, the polarization part may include a first layer oriented in the one direction, and a second layer on one side of the first layer to support the first layer.

In an embodiment, the pattern part may include a lyotropic chromonic liquid crystal or a reactive mesogen.

In an embodiment, the pattern part may be on one side of the first layer, on one side of the second layer, or between the first layer and the second layer.

In an embodiment, the pattern part may have a frame shape in a plan view.

BRIEF DESCRIPTION OF THE FIGURES

The accompanying drawings are included to provide a further understanding of the inventive concept, and are incorporated in and constitute a part of this application. The drawings illustrate exemplary embodiments of the inventive concept and, together with the description, serve to explain principles of the inventive concept. In the drawings.

DETAILED DESCRIPTION

Figure 1:
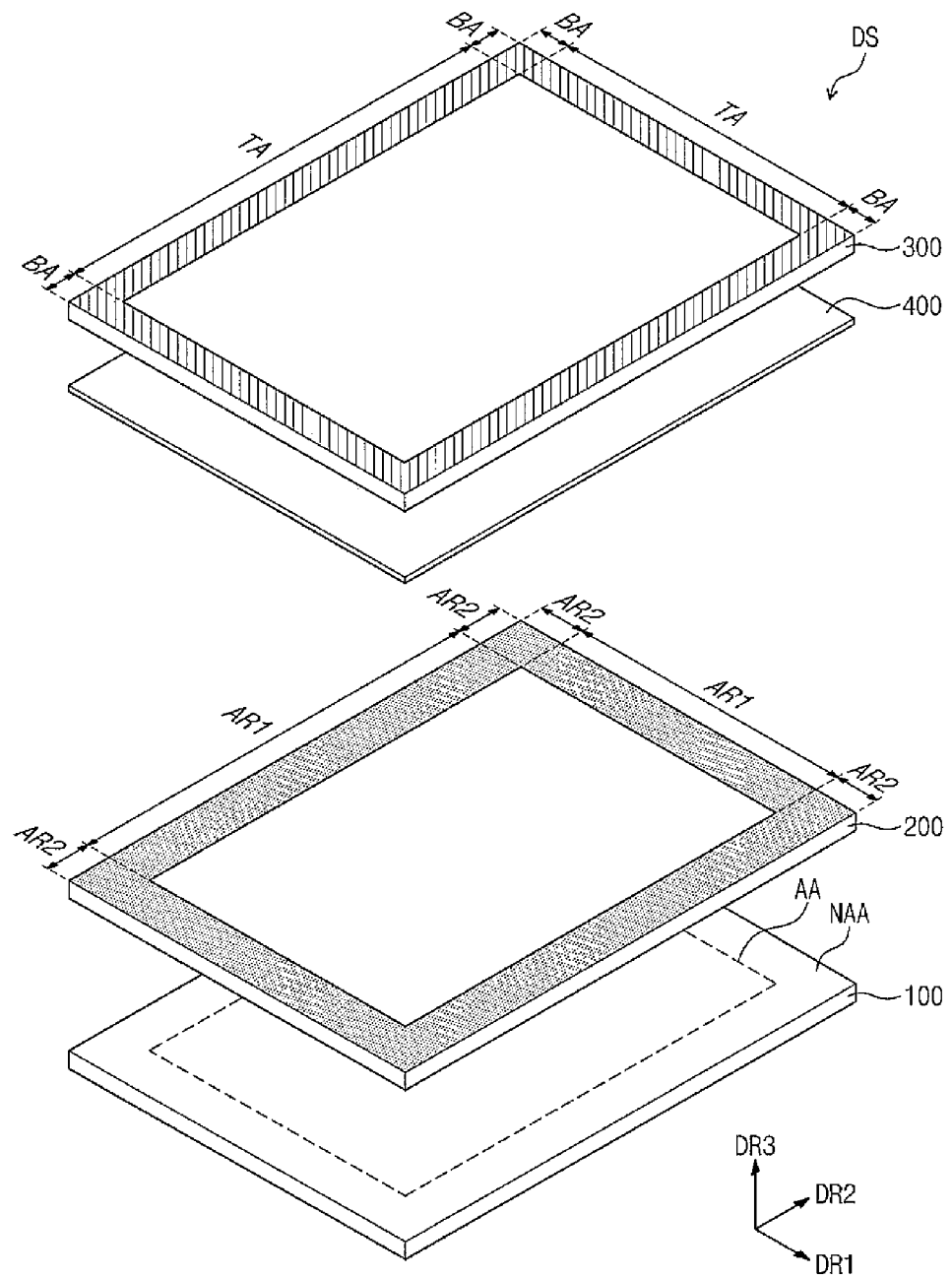
FIG. 1 is an exploded perspective view of a display device according to an embodiment of the inventive concept.

Hereinafter, example embodiments of the inventive concept will be described with reference to the accompanying drawings to fully explain the inventive concept in such a manner that it may easily be carried out by those skilled in the art.

It will be understood that, although the terms "first," "second," "third," etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the present invention.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it will also be understood that when one element, component, region, layer, and/or section is referred to as being "between" two elements, components, regions, layers, and/or sections, it can be the only element, component, region, layer, and/or section between the two elements, components, regions, layers, and/or sections, or one or more intervening elements, components, regions, layers, and/or sections may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

It will be understood that when an element or layer is referred to as being "on," "connected to," "coupled to," "connected with," "coupled with," or "adjacent to" another element or layer, it can be "directly on," "directly connected to," "directly coupled to," "directly connected with," "directly coupled with," or "directly adjacent to" the other element or layer, or one or more intervening elements or layers may be present. Furthermore, "connection," "connected," etc., may also refer to "electrical connection," "electrically connected," etc., depending on the context in which such terms are used as would be understood by those skilled in the art. When an element or layer is referred to as being "directly on," "directly connected to," "directly coupled to," "directly connected with," "directly coupled with," or "immediately adjacent to" another element or layer, there are no intervening elements or layers present.

As used herein, "substantially," "about," and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

Figure 2:
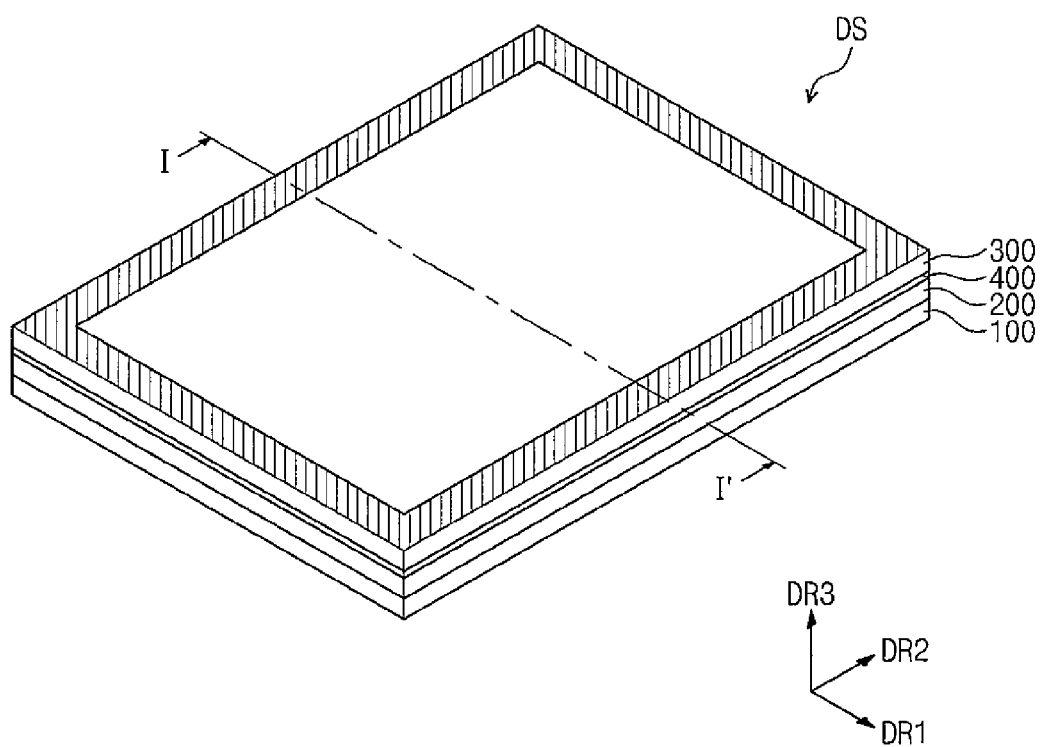
FIG. 2 is a combined perspective view of the display device in FIG. 1.

FIG. 1 is an exploded perspective view of a display device according to an embodiment of the inventive concept. FIG. 2 is a combined perspective view of the display device in FIG. 1. Hereinafter, the display device DS according to an embodiment of the inventive concept will be described with reference to FIGS. 1 and 2.

The display device DS includes a display member 100, a polarizer 200 (e.g., a polarization member 200), a cover 300 (e.g., a cover member 300), and a bonding member 400. The display member 100 displays images according to electric signals. The display member 100 also senses external touch inputs applied to the display device DS.

The display member 100 has (e.g., is divided into) an active region AA and a surrounding region NAA on a plane (e.g., in a plan view) defined by a first direction DR1 and a second direction DR2. The active region AA is activated according to applied electric signals. When electric signals are applied to the display member 100, the active region AA displays an image, and/or enters a state in which an external touch input can be sensed.

The surrounding region NAA is adjacent to the active region AA. The surrounding region NAA may have various suitable shapes. As illustrated in FIG. 1, the surrounding region NAA may be defined as a frame shape surrounding the active region AA. Although this is illustrated as an example, the surrounding area NAA may be defined as various suitable shapes, and is not limited to any one shape.

In the polarizer 200, an absorption axis extending in a direction parallel to one direction is defined. The polarizer 200 absorbs fight vibrating in a direction parallel to the absorption axis among light incident on the polarizer 200.

The polarizer 200 has (e.g., is divided into) a first region AR1 and a second region AR2. The first region AR1 is defined as a region having a first transmittance in the polarizer 200, and the second region AR2 is defined as a region having a second transmittance which is different from the first transmittance. Thus, on a plane, the polarizer 200 may have (e.g., be divided into) a plurality of regions having different transmittances.

The first region AR1 is defined at the center of the polarizer 200. The first region AR1 covers at least the active region AA.

In the polarizer 200, the transmittance of a portion corresponding to the second region AR2 is lower than that of a portion corresponding to the first region AR1. Thus, light incident on the polarizer 200 is transmitted through the polarizer 200, with the first region AR1 and the second region AR2 having different transmittances of light.

The second region AR2 is adjacent to the first region AR1. The second region AR2 may have various suitable shapes. For example, as illustrated in FIG. 1, the second region AR2 may be defined as a frame shape surrounding the first region AR1. Although this is illustrated as an example, the second region AR2 may be defined as various suitable shapes, and is not limited to any one shape.

In this embodiment, the first region AR1 and the second region AR2 are different from each other only in the transmittances thereof, but not in polarization functions thereof. Thus, the amount of light transmitted through the polarizer 200 may vary according to the regions, while the light transmitted through the polarizer 200 may have the polarization properties of vibrating in substantially the same (e.g., the same) direction in each region of the polarizer 200.

The cover 300 is disposed on the polarizer 200. The cover 300 protects the display member 100, and defines the appearance of the display device DS. The cover 300 may have (e.g., be divided into) a transmission region TA and a bezel region BA on a plane.

The transmission region TA substantially transmits light incident on the cover 300. A portion defining the transmission region TA in the cover 300 has a transmittance of about 90% or higher. Images displayed in the active region AA are viewed from the outside through the transmission region TA.

The bezel region BA is adjacent to the transmission region TA. The bezel region BA may have various suitable shapes. For example, as illustrated in FIG. 1, the bezel region BA may be defined as a frame shape surrounding the transmission region TA.

The bezel region BA substantially blocks incident light. The bezel region BA defines the transmission region TA. As illustrated in FIG. 2, the bezel region BA defines a bezel of the display device DS in an assembled state, and may serve to enhance the aesthetic sense of the display device DS.

The bezel region BA blocks light incident on the back surface of the cover 300, and thus prevents or substantially prevents light from leaking to the outside from areas other than the transmission region TA. Also, the bezel region BA blocks light incident on the front surface of the cover 300, thereby being capable of preventing or substantially preventing visual recognition of wires or various elements (or components) disposed in the surrounding region NAA and reducing the reflectivity of ambient light.

The bonding member 400 may be disposed between the cover 300 and the polarizer 200. The bonding member 400 couples the cover 300 and the polarizer 200. Thus, even when external impacts are delivered to the display device DS, the distance between the second region AR2 and the bezel region BA do not vary from the distance set at the time of assembly.

Although this is illustrated as an example, a plurality of bonding members 400 may be provided so that another bonding member is disposed between the display member 100 and the polarizer 200. In this case, distances between the active region AA, the second region AR2, and the bezel region BA at the time of assembling may be easily fixed. On the other hand, in the display device DS according to an embodiment of the inventive concept, the bonding member 400 may not be provided.

Further, a housing member may be included in the display device DS. In the housing member, an internal space (e.g., a predetermined internal space) is defined, and the display member 100 and the polarizer 200 may be housed therein. The housing member may be coupled with the cover 300 to define the appearance of the display device DS.

Figure 3:
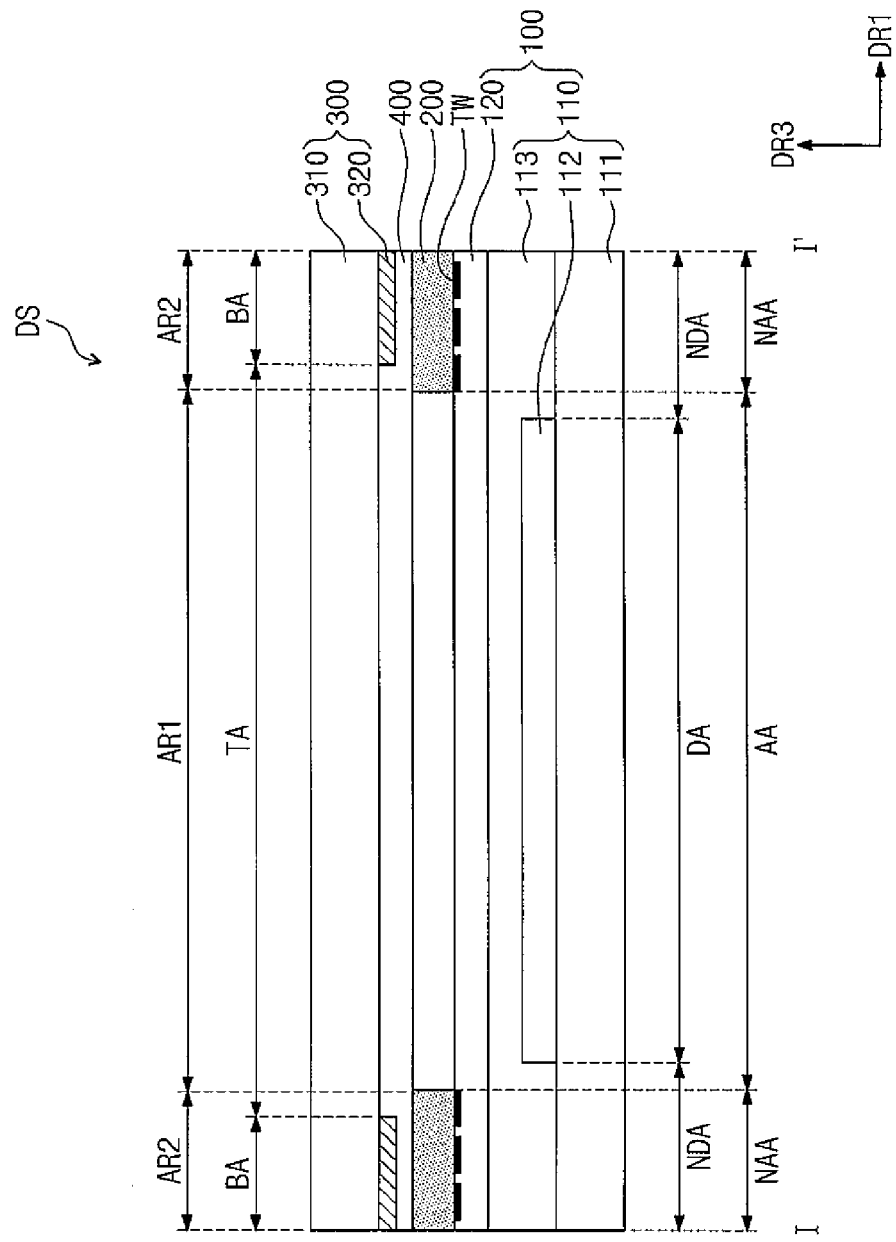
FIG. 3 is a sectional view taken along the line I-I' in FIG. 2.
Figure 4A:
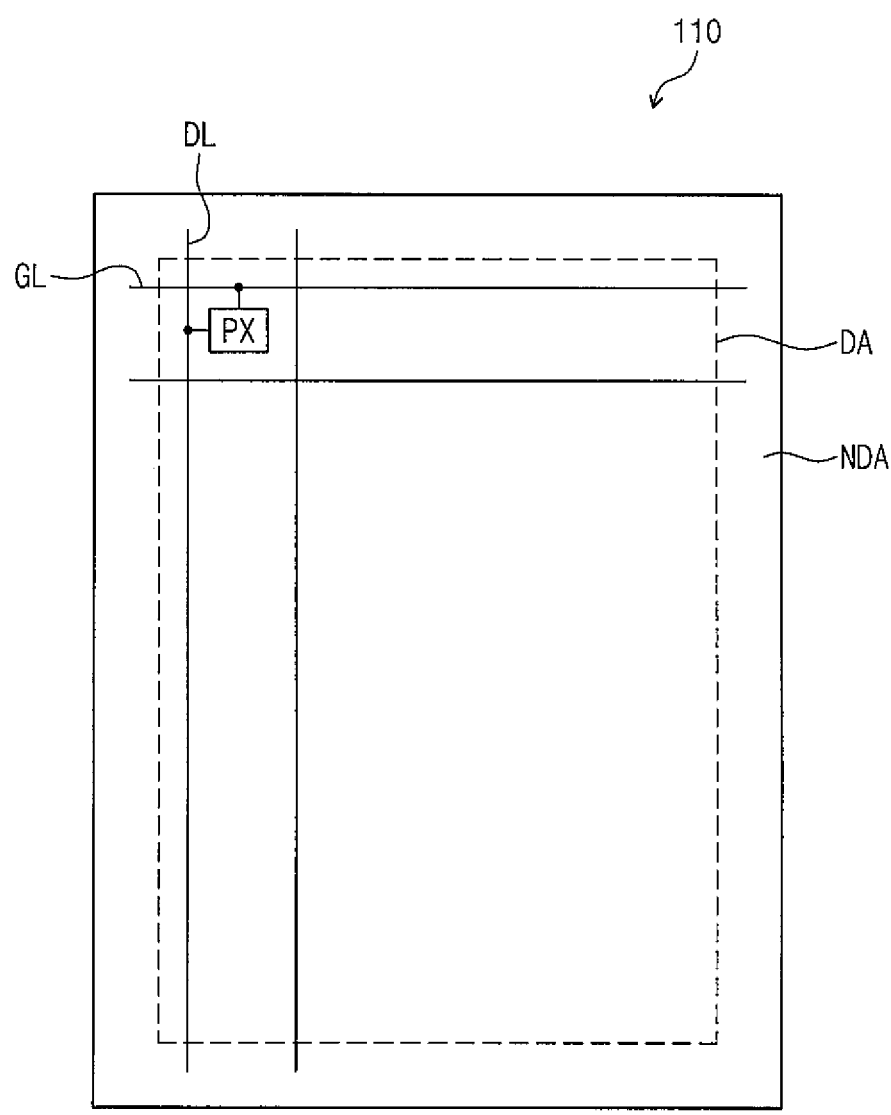
FIGS. 4A and 4B are plan views schematically illustrating some components in FIG. 1.
Figure 4B:
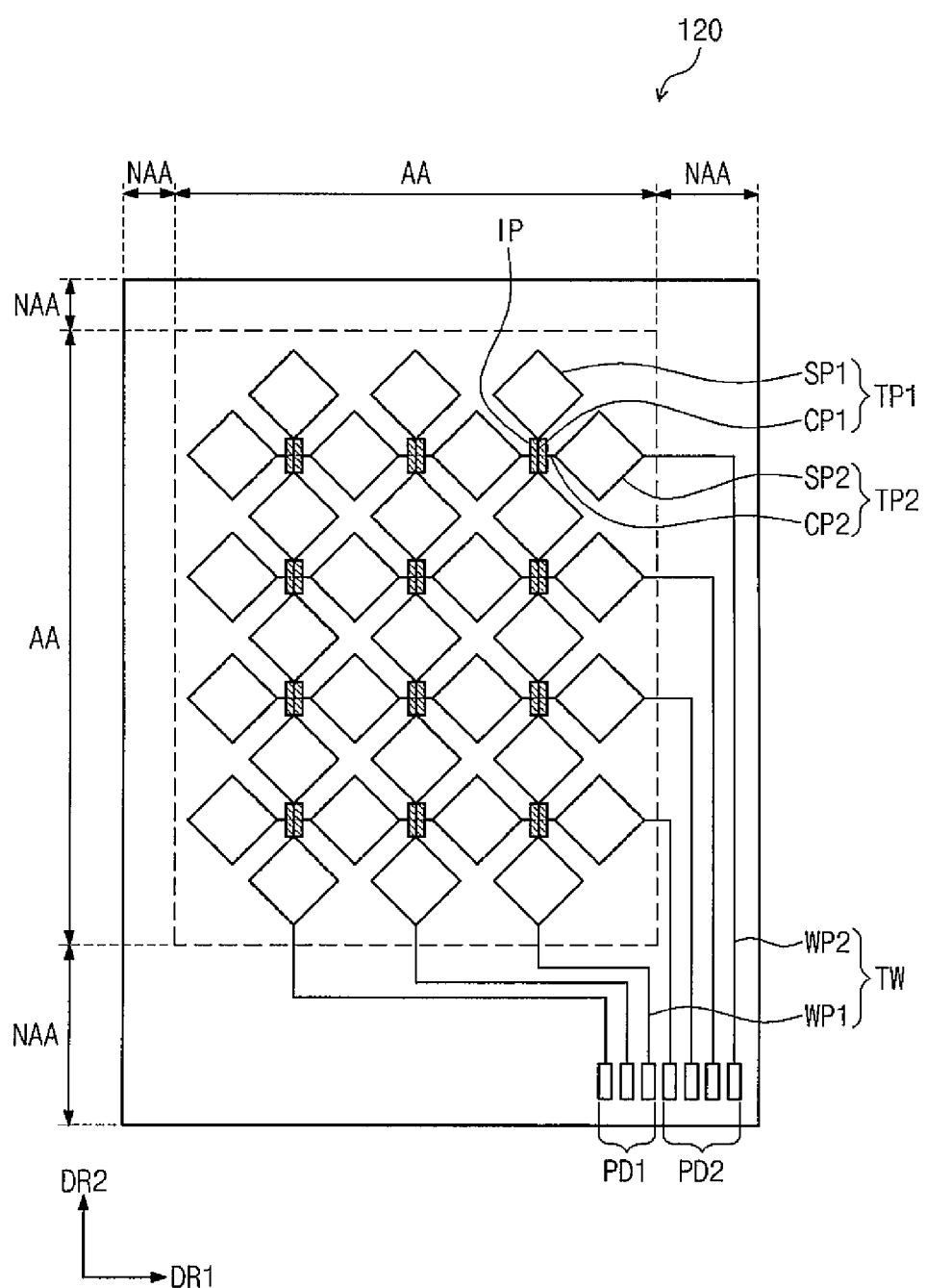

FIG. 3 is a sectional view taken along the line I-I' in FIG. 2. FIGS. 4A and 4B are plan views schematically illustrating some components in FIG. 1. Hereinafter, the display device according to an embodiment of the inventive concept will be described in detail with reference to FIGS. 3 to 4B.

As illustrated in FIG. 3, the display member 100, the polarizer 200, the bonding member 400, and the cover 300 are sequentially laminated in a third direction DR3 to constitute the display device DS. Each of the components constituting the display device DS may have (e.g., be divided into) various suitable regions on a plane, as described above.

The display member 100 may include a display panel 110 and a touch panel 120. The display panel 110 generates images according to electric signals. The display panel 110 may be, for example, but not limited to, an organic light emitting display panel, a liquid crystal display panel, a plasma display panel, an electrophoretic display panel, or an electrowetting display panel.

In FIG. 3, a structure in which the display panel 110 and the touch panel 120 are laminated is illustrated as an example. Referring to FIGS. 3 and 4A, the display panel 110 includes a base layer 111, a pixel layer 112, and an encapsulation layer 113.

The base layer 111 may be formed of an insulating material. For example, the base layer 111 may be formed of glass or plastic. Although this is described as an example, the base layer 111 according to the inventive concept is not limited to any one type.

The pixel layer 112 is disposed on the base layer 111. The pixel layer 112 includes a plurality of pixels PX and a plurality of signal lines GL and DL. The signal lines GL and DL include a plurality of gate lines GL and a plurality of data lines DL.

The gate lines GL each extend in the first direction DR1 and are arranged along the second direction DR2. The gate lines GL are connected to a gate driver, which is provided at a non-display region NDA, and sequentially receive gate signals to provide to the pixels PX.

The data lines DL each extend in the second direction DR2 and are arranged along the first direction DR1. The data lines DL are connected to a data driver, which is disposed at the non-display region NDA or separately provided, and receive data signals to provide to the pixels PX.

The pixels PX may be arranged in a matrix form on a plane defined by the first direction DR1 and the second direction DR2. The pixels PX are turned on by receiving gate signals from corresponding gate lines, and the pixels PX receive data signals from corresponding data lines to display an image corresponding to the data signals. At least one thin film transistor and a display element may be included in each of the pixels.

The display element may include an organic light emitting element, a liquid crystal capacitor, an electrophoretic element, or a conductive ink. In this embodiment, the display panel 110 corresponding to an organic light emitting display panel including organic light emitting elements will be described as an example.

The pixels generate light according to electric signals to realize images. Thus, a region in which the pixel layer 112 is disposed may correspond to a display region DA in which images are displayed.

The encapsulation layer 113 is disposed on the base layer 111 to cover the pixel layer 112. The encapsulation layer 113 seals the pixel layer 112 to protect the pixel layer 112 from the outside.

The encapsulation layer 113 may be formed of a material having a high light transmittance so that light generated from the pixel layer 112 is visually recognized from the outside. The encapsulation layer 113 may have a layered structure in which a plurality of organic films and/or inorganic films is laminated. Thus, the encapsulation layer 113 may be provided as a thin film, thereby being capable of improving flexibility of the display panel 110.

Alternatively, the encapsulation layer 113 may be a glass substrate or a plastic substrate. Accordingly, the encapsulation layer 113 may have improved rigidity, and reliability of the display panel 110 may thus be improved. The display panel 110 may further include a sealing member (e.g., a predetermined sealing member) coupling the encapsulation layer 113 and the base layer 111.

Referring to FIGS. 3 and 4B, the touch panel 120 calculates coordinate information of an external input. Examples of the external input include inputs by means of a stylus pen, fingers of a user, and/or the like. The external input may occur substantially on the cover 300. The touch panel 120 is not limited to any one type, but, for example, a resistive touch panel, a capacitive touch panel, and/or the like may be used.

The touch panel 120 includes a plurality of touch electrodes TP1 and TP2, a plurality of wires TW, and a plurality of pads PD1 and PD2. In FIG. 3, only the wires TW are illustrated as an example for ease of description.

The touch electrodes TP1 and TP2 are disposed in the active region AA. The touch electrodes TP1 and TP2 sense touch inputs. The touch electrodes TP1 and TP2 include a plurality of first touch electrodes TP1, each of which extends in the second direction DR2, and a plurality of second touch electrodes TP2, each of which extends in the first direction DR1. The first touch electrodes TP1 and the second touch electrodes TP2 insulatively cross each other.

Each of the first touch electrodes TP1 includes a plurality of first sensing parts SP1 arranged along the second direction DR2, and a plurality of first connecting parts CP1, each of which is disposed between the first sensing parts SP1. Likewise, each of the second touch electrodes TP2 includes a plurality of second sensing parts SP2 arranged along the first direction DR1, and a plurality of second connecting parts CP2 each of which is disposed between the second sensing parts SP2.

In this embodiment, the first sensing parts SP1 and the second sensing parts SP2 may be disposed on the same or substantially the same layer. Thus, the touch panel 120 may further include a plurality of insulating patterns IP. The insulating patterns IP are respectively disposed between the first connecting parts CP1 and the second connecting parts CP2 to insulate the first connecting parts CP1 and the second connecting parts CP2.

Although this is illustrated as an example, the first touch electrodes TP1 and the second touch electrodes TP2 may be disposed on different layers. In this case, the touch panel 120 may further include an insulating layer which corresponds to the active region AA and insulates the first touch electrodes TP1 and the second touch electrodes TP2. The touch panel according to the inventive concept may include various suitable types, and is not limited to any one type.

The pads PD1 and PD2 are disposed in the surrounding region NM. The pads PD1 and PD2 are connected to the outside to receive driving signals from the outside or provide touch signals to the outside.

The pads PD1 and PD2 include a plurality of first pads PD1 and a plurality of second pads PD2. The first pads PD1 respectively correspond to the first touch electrodes TP1, and the second pads PD2 respectively correspond to the second touch electrodes TP2.

The wires TW are disposed in the surrounding region NAA. The wires TW respectively connect the touch electrodes TP1 and TP2 to corresponding pads PD1 and PD2. The wires TW include a plurality of first wires WP1 and a plurality of second wires WP2.

The boundary between the surrounding region NAA and the active region AA may be defined by the wires TW. Thus, the active region AA may be defined such that the active region AA overlaps a portion of the non-display region NDA as well as the display region DA.

Although this is illustrated as an example, in the display member 100 according to an embodiment of the inventive concept, the active region AA may be identical to the display region DA. In this case, the surrounding region NAA, in which the wires TW are disposed, may correspond to the non-display region NDA.

Referring to FIG. 3 again, as described above, the second region AR2 in the polarizer 200 covers at least the surrounding region NAA. In FIG. 3, an embodiment, in which the first region AR1 and the second region AR2 are defined to respectively correspond to the active region AA and the surrounding region NAA, is illustrated, but the present invention is not limited thereto. The second region AR2 covers the wires TW disposed in the surrounding region NAA.

In the polarizer 200, a portion corresponding to the first region AR1 has such a high transmittance that images displayed by the display member 100 are clearly viewed from the outside. For example, in the polarizer 200, the portion corresponding to the first region AR1 may have a transmittance of about 85% or higher.

In the polarizer 200, a portion corresponding to the second region AR2 has such a transmittance that at least the wires TW are difficult to clearly view. For example, in the polarizer 200, the portion corresponding to the second region AR2 may have a transmittance lower than about 50%.

The cover 300 may include a base member 310 and a color pattern layer 320. The base member 310 defines the transmittance of the transmission region TA.

Thus, the base member 310 may be formed of a transparent insulating material. The transparent insulating material refers to a material having an optically high light transmittance, and may refer to a non-opaque insulating material.

For example, the base member 310 may be a plastic substrate, such as polyimide, polycarbonate, polyethyleneterephthalate, or polymethyl methacrylate, or may be a glass substrate.

The color pattern layer 320 may include a material capable of exhibiting a color (e.g., a predetermined color). For example, the color pattern layer 320 may be formed of organic and/or inorganic pigments, organic and/or inorganic dyes, or a mixture thereof.

The color pattern layer 320 is disposed on the back surface of the base member 310 to define the bezel region BA. The bezel region BA has such a low transmittance that incident light is substantially blocked. Thus, the transmittance of the bezel region BA may be lower than about 10%.

In this embodiment, the bezel region BA may not overlap at least a portion of the surrounding region NAA. That is, the boundary between the bezel region BA and the transmission region TA may be defined in a region overlapping the surrounding region NAA.

Thus, as illustrated in FIG. 3, when the cover 300, the polarizer 200, and the display member 100 are assembled such that the end of the cover 300, the end of the polarizer 200, and the end of the display member 100 are aligned, the bezel region BA may be defined to have a width smaller than that of the surrounding region NAA.

As described above, the second region AR2 has a transmittance lower than that of the first region AR1. Accordingly, the wires TW are covered by the second region AR2, and are thus difficult to view from the outside. Also, the amount of ambient light incident on the wires TW is reduced, and the reflectivity of ambient light in a region in which the wires TW are disposed may thus be reduced.

In this embodiment, the second region AR2 has a transmittance higher than that of the bezel region BA. Thus, because the second region AR2 is distinguished from the bezel region BA while weakening visibility of the wires TW thereunder, the second region AR2 may not be visually recognized as the bezel of the display device DS. Therefore, users may visually recognize only the bezel region BA as the bezel of the display device DS.

The display device DS according to an embodiment of the inventive concept includes the polarizer 200 in which the second region AR2 is defined, thereby being capable of realizing a slim bezel or providing a bezel having gradient aesthetics.

For example, when the difference of transmittances between the second region AR2 and the bezel region BA is large, it is more likely to visually recognize the bezel region BA as a bezel, so that the display device DS may provide a slim bezel. When the difference of transmittances between the second region AR2 and the bezel region BA is small, the display device DS may provide a bezel having gradient aesthetics.

In the display device according to an embodiment of the inventive concept, a plurality of regions having different transmittances are defined in a single polarizer, so that additional optical films for controlling transmittance may be omitted. Accordingly, the thickness of the display device is reduced, and a thin display device is thus realized.

Figure 5:
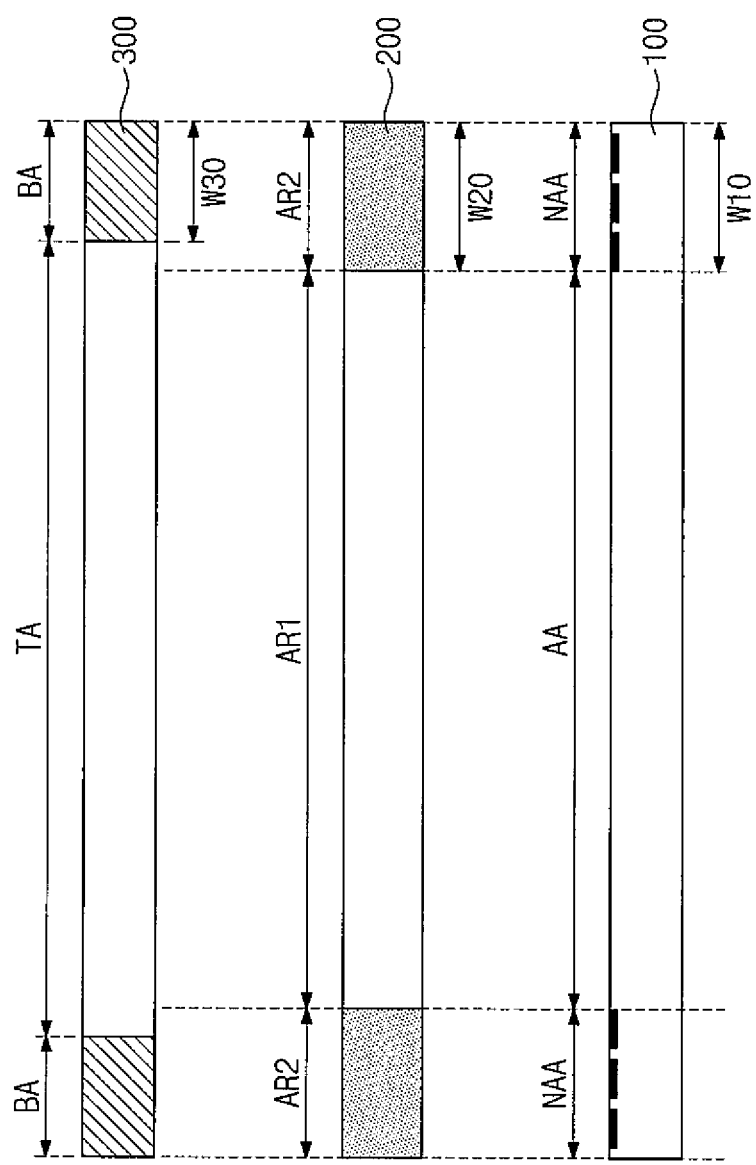
FIG. 5 is a sectional view schematically illustrating some components of a display device according to an embodiment of the inventive concept.

FIG. 5 is a sectional view schematically illustrating some components of a display device according to an embodiment of the inventive concept. In FIG. 5, only the display member 100, the polarizer 200, and the cover 300 are schematically illustrated for ease of description, and respective ends of the display member 100, the polarizer 200, and the cover 300 are illustrated as being aligned.

Hereinafter, the polarizer 200 according to an embodiment of the inventive concept will be described with reference to FIG. 5. For the same components as those illustrated in FIGS. 1 to 4B, the same reference numerals or symbols are given and repetitive description may be omitted.

The surrounding region NAA defined in the display member 100 has a first width W10, and the second region AR2 in the polarizer 200 has a second width W20.

As described above, the second region AR2 covers at least the wires TW. In this embodiment, because the wires TW are disposed up to the boundary between the surrounding region NAA and the active region AA, the second width W20 is defined as a size corresponding to the first width W10.

Although this is illustrated as an example, the wires TW may be disposed within the surrounding region NAA, and thus spaced apart from the boundary between the surrounding region NAA and the active region AA on a plane. The surrounding region NAA according to an embodiment of the inventive concept is merely limited as a region in which the wires TW are disposed, but the position of the boundary between the surrounding region NAA and the active region AA is not limited by the wires TW.

The bezel region BA in the cover 300 has a third width W30. When the end of the cover 300 is aligned with the end of the polarizer 200, the third width W30 is defined to be smaller than the second width W20.

As described above, the second width W20 corresponds to the first width W10. Thus, the bezel region BA may not cover the entire surrounding region NAA. The surrounding region NAA is first covered by the second region AR2. Thus, even when the bezel region BA has the third width W30 smaller than the first width W10, the wires TW are not visually recognized. Therefore, the display device may realize a slim bezel regardless of the width of the surrounding region NAA.

Figure 6A:
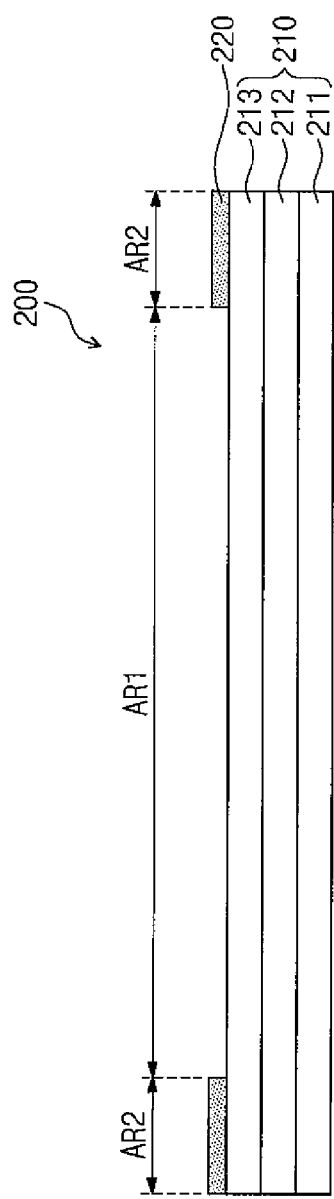
FIGS. 6A to 6C are sectional views of polarizers according to embodiments of the inventive concept.
Figure 6B:
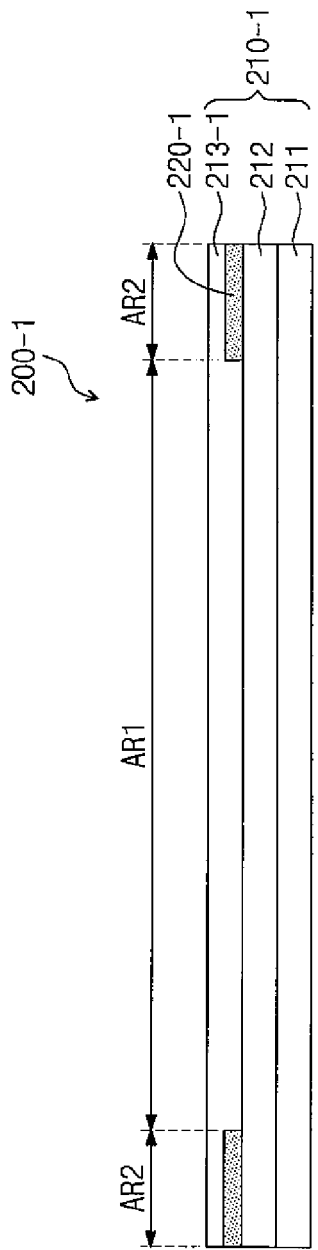
Figure 6C:
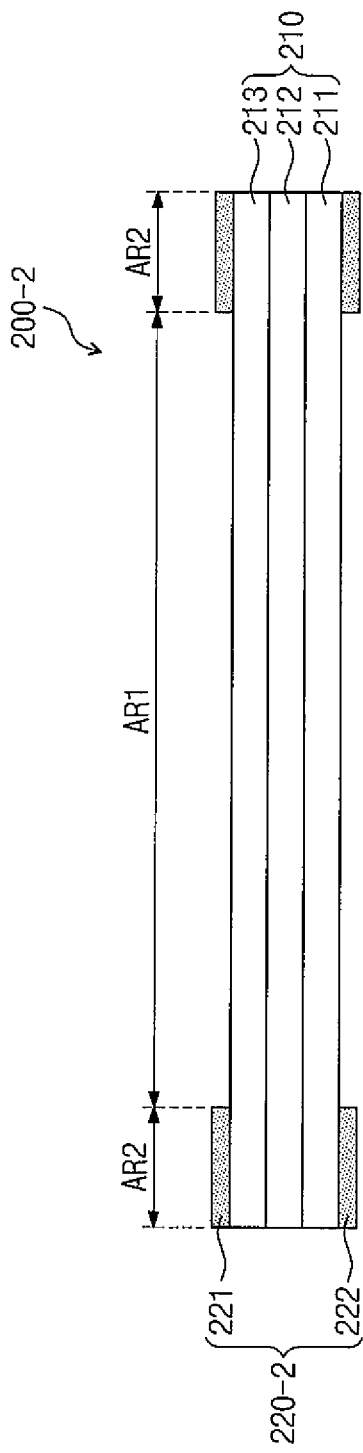

FIGS. 6A to 6C are sectional views of polarizers according to embodiments of the inventive concept. In FIGS. 6A to 6C, polarizers including the same or substantially the same components are illustrated for ease of description. Hereinafter, the polarizers will be described with reference to FIGS. 6A to 6C.

As illustrated in FIG. 6A, the polarizer 200 includes a polarization part 210 and a pattern part 220. The polarization part 210 includes a first layer 211, a second layer 212, and a third layer 213.

The first layer 211 defines one side of the polarizer 200. The first layer 211 may protect the second layer 212, or may be a support layer supporting the second layer 212. For example, the first layer 211 may be a tri-acetyl cellulose (TAC) film.

Or, the first layer 211 may be an optical film. The first layer 211 may function to compensate for the optical properties of the polarizer 200. For example, the first layer 211 may be a retardation film.

Or, the first layer 211 may be an adhesive film. The first layer 211 allows the polarizer 200 to be directly coupled to the display member 100 (see FIG. 1). For example, the first layer 211 may be an optical clear adhesive (OCA) layer or a pressure sensitive adhesive (PSA) layer. The first layer 211 may further include polyvinyl alcohol.

The second layer 212 may be a polarization layer defining the polarization properties of the polarizer 200. The second layer 212 may include a film, such as a polyvinyl alcohol (PVA) film, and iodine ions or dichroic dye molecules, which are oriented in one direction in the film. The orientation direction of the iodine ions or dye molecules may be defined as the absorption axis of the polarizer 200.

The second layer 212 absorbs light vibrating in a direction parallel to an absorption axis-extending direction. Thus, light incident on the back side of the polarizer 200 may be transmitted as polarized light. Furthermore, light vibrating in the absorption axis among light incident on the front side of the polarizer 200 is absorbed by the second layer 212, and the second layer 212 may thus reduce the reflectivity of ambient light in the polarizer 200.

The third layer 213 defines the other side of the polarizer 200. The third layer 213 is spaced apart from the first layer 211, with the second layer 212 being disposed therebetween. Thus, the third layer 213 may be provided as a layer corresponding to the first layer 211. For example, the third layer 213 may be a support layer, a protective layer, or an adhesive layer.

Although this is illustrated as an example, the polarization part 210 may further include other suitable layers, and the other suitable layers may be located between any two of the first to third layers 211, 212, and 213. The polarizer 200 may include various suitable types, and is not limited to any one type.

The pattern part 220 is disposed on one side of the polarization part 210.

The pattern part 220 partially covers the polarization part 210. The shape of the pattern part 220 is substantially the shape of the second region AR2.

The pattern part 220 may have a third transmittance. The transmittance of the second region AR2 may be defined by a calculation using the transmittance of the polarization part 210 and the transmittance of the pattern part 220.

The third transmittance may be lower than 100%. Thus, the transmittance of the second region AR2 overlapping the pattern part 220 may be lower than the transmittance of the first region AR1 not overlapping the pattern part 220. In this embodiment, the transmittance of the pattern part 220 may be controlled such that the transmittance of the second region AR2 is lower than about 45%.

The pattern part 220 may include various embodiments which have a suitable transmittance (e.g., a suitable predetermined transmittance). For example, the pattern part 220 may be formed of a material having a transmittance of about 90% or less.

The pattern part 220 may include a coating-type polarizer which is provided as a liquid phase. For example, the pattern part 220 may be a guest-host type polarization layer. In this case, the polarization layer may be formed using a photo initiator and reactive mesogen (RM) instead of the dichroic dye.

Or, for example, the pattern part 220 may be a lyotropic type polarization layer using a lyotropic chromonic liquid crystal (LCLC). In this case, the polarization layer may be formed using a liquid crystal form instead of dye and copolymer forms.

The lyotropic chromonic liquid crystal, which forms a liquid crystal phase, may be coated as an aqueous solution on a substrate. When a shear force (e.g., a predetermined shear force) is applied to the liquid crystal dye, all of the molecules in the liquid crystal are aligned in the same or substantially the same orientation even after the solvent is dried, and the liquid crystal may thus function as a polarization layer.

The polarizer 200 according to an embodiment of the inventive concept forms the pattern part 220 using the coating-type polarizer, thereby being capable of reducing the thickness of the polarizer 200, improving flexibility of the polarizer 200, and allowing the pattern part 220 to be brought into close contact with the polarization part 210.

In this embodiment, the transmittance of the first region AR1 is defined by the polarization part 210. Thus, the transmittance of the first region AR1 depends on respective transmittances of the first layer 211, the second layer 212, and the third layer 213.

The transmittance of the second region AR2 is defined by the polarization part 210 and the pattern part 220. Because the polarization part 210 overlaps the first region AR1 and the second region AR2, the difference of transmittances between the second region AR2 and the first region AR1 is substantially determined according to the transmittance of the pattern part 220. The polarizer 200 according to the inventive concept further includes the pattern part 220, thereby being capable of easily defining the second region AR2 which is different in transmittance from the first region AR1.

As illustrated in FIG. 6B, the polarizer 200-1 may have a structure in which the pattern part 220-1 is in the polarization part 210-1. In this case, the pattern part 220-1 may be between two layers among layers constituting the polarization part 210-1.

In FIG. 6B, the pattern part 220-1 disposed between the second layer 212 and the third layer 213-1 is illustrated. In this case, when the third layer 213-1 is provided as a liquid phase, the third layer 213-1 may cover the step between the pattern part 220-1 and the second layer 212.

As illustrated in FIG. 6C, the polarizer 200-2 may include a plurality of pattern parts 220-2. The pattern parts 220-2 may include a first pattern part 221 and a second pattern part 222.

The second pattern part 222 is disposed on the back surface of the polarization part 210. Thus, the second pattern part 222 may be disposed on one side of the first layer 211.

The first pattern part 221 is disposed on the front surface of the polarization part 210. Thus, the first pattern part 221 may be disposed on one side of the third layer 213.

The second region AR2 is defined by the first pattern part 221 and the second pattern part 222. In FIG. 6C, an embodiment, in which the first pattern part 221 and the second pattern part 222 are aligned in the same or substantially the same shape, is illustrated.

Although this is illustrated as an example, the first pattern part 221 and the second pattern part 222 may have different sizes or shapes, or may include portions not overlapping each other on a plane. In this case, the second region AR2 may be defined by the first pattern part 221 and a portion not overlapping the first pattern part 221 in the second pattern part 222.

At least any one of the first pattern part 221 and the second pattern part 222 may be in the polarization part 210. The polarizer according to an embodiment of the inventive concept may further include another pattern part in addition to the first pattern part 221 and the second pattern part 222. The polarizer according to the inventive concept may include various suitable types, and is not limited to any one type.

Figure 7:
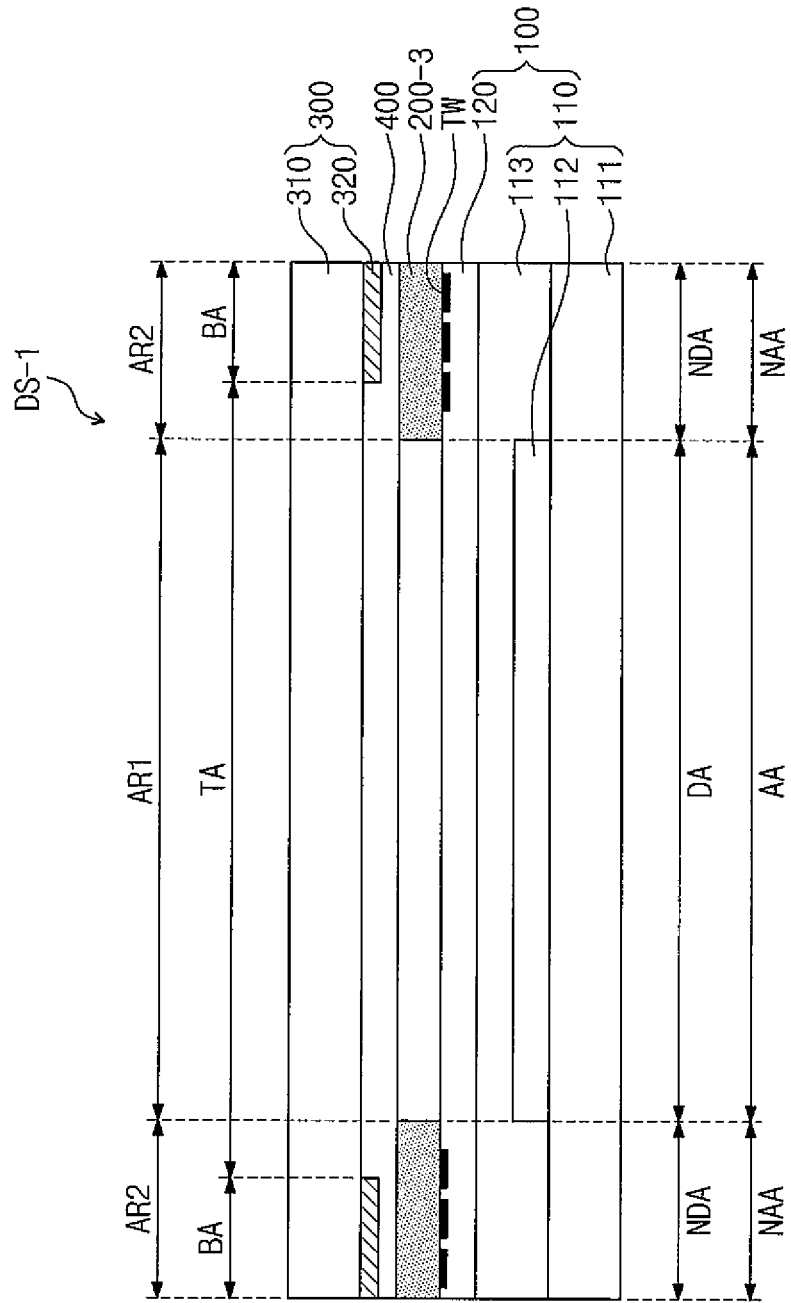
FIG. 7 is a sectional view of a display device according to an embodiment of the inventive concept.

FIG. 7 is a sectional view of a display device according to an embodiment of the inventive concept. The display device DS-1 will be described with reference to FIG. 7.

In FIG. 7, components other than the polarizer 200-3 are illustrated to correspond to the display device DS in FIG. 3 for ease of description. Hereinafter, for the same components as those illustrated in FIGS. 1 to 6C, the same reference numerals or symbols are given and repetitive description may be omitted.

As illustrated in FIG. 7, the surrounding region NAA of the display member 100 may be defined to correspond to the non-display region NDA. Thus, the boundary between the surrounding region NAA and the active region AA may be defined between the wires TW and the pixel layer 112.

The second region AR2 in the polarizer 200-3 is defined to correspond to the surrounding region NM. Thus, the second region AR2 is defined to cover the wires TW and correspond to the non-display region NDA.

As illustrated in FIG. 7, the bezel region BA may be defined not to overlap a portion of the wires TW. When the second region AR2 is not defined, the bezel region BA has a large area in order to cover the wires TW. The display device DS-1 according to an embodiment of the inventive concept further includes the polarizer 200-3, thereby being capable of easily realizing a slim bezel regardless of the arrangement of the wires TW.

According to embodiments of the inventive concept, it is possible to realize different transmittances according to regions using a single polarizer, and a thin display device is thus realized.

According to embodiments of the inventive concept, a region corresponding to a bezel is defined as a low-transmittance region, thereby being capable of preventing or reducing light leakage and reducing visibility of wires using the polarizer. The bezel of the display device may be free from wiring arrangement, and may have a slim shape with a reduced width.

It should be obvious to a person skilled in the art that the inventive concept is not limited to the above described embodiments, but may be variously changed and modified without departing from the spirit and scope of the invention. Therefore, such modifications or changes would fall within the spirit and scope of the claims of the invention and their equivalents.

What is claimed is:

1. A display device comprising:
   a display member having an active region in which images are displayed and a surrounding region adjacent to the active region, wires being disposed in the surrounding region;
   a cover having a transmission region through which the images are transmitted and a bezel region adjacent to the transmission region; and
   a polarizer between the display member and the cover, the polarizer having, in a plan view, a first region overlapping the active region and having a first transmittance and a second region overlapping the surrounding region and having a second transmittance lower than the first transmittance.

2. The display device of claim 1, wherein the second region entirely overlaps at least the wires.

3. The display device of claim 2, wherein a portion of the second region does not overlap the bezel region.

4. The display device of claim 3, wherein a boundary between the bezel region and the transmission region overlaps the second region.

5. The display device of claim 4, wherein a portion of the surrounding region does not overlap the bezel region.

6. The display device of claim 1, wherein the second transmittance is higher than the transmittance of the cover in the bezel region.

7. The display device of claim 6, wherein the display member comprises:
   a display panel configured to generate the images; and
   a touch panel on the display panel, the touch panel being configured to receive external touch inputs.

8. The display device of claim 7, wherein the touch panel comprises:
   a plurality of touch electrodes which are in the active region and configured to sense external touch inputs; and
   a plurality of pads in the surrounding region, the wires respectively connecting the touch electrodes and the pads.

9. The display device of claim 8, wherein a portion of the wires does not overlap the bezel region.

10. The display device of claim 1, wherein the polarizer comprises:
    a polarization part overlapping the first and second regions and being configured to absorb light vibrating in one direction among incident light; and
    a pattern part corresponding to the second region.

11. The display device of claim 10, wherein the pattern part comprises a lyotropic chromonic liquid crystal or a reactive mesogen.

12. The display device of claim 11, wherein the polarization part comprises a plurality of layers, and the pattern part is between at least any two layers among the plurality of layers.

13. The display device of claim 12, wherein the pattern part has a frame shape in a plan view.

* * * * *